United States Patent
Delisle et al.

(10) Patent No.: US 6,711,311 B2
(45) Date of Patent: Mar. 23, 2004

(54) POLARIZATION BEAM SPLITTER OR COMBINER

(75) Inventors: Vincent Delisle, Ottawa (CA); Gonzalo Wills, Ottawa (CA); Pierre D. Wall, Ottawa (CA); Alan J. P. Hnatiw, Stittsville (CA); Yihao Cheng, Nepean (CA); Dean Sheldon Spicer, Gloucester (CA); Sheldon McLaughlin, Kanata (CA)

(73) Assignee: JDS Uniphase Inc., Ottawa (CA)

( * ) Notice: Subject to any disclaimer, the term of this patent is extended or adjusted under 35 U.S.C. 154(b) by 161 days.

(21) Appl. No.: 09/836,465

(22) Filed: Apr. 18, 2001

(65) Prior Publication Data

US 2001/0036330 A1 Nov. 1, 2001

Related U.S. Application Data

(60) Provisional application No. 60/218,136, filed on Jul. 14, 2000, and provisional application No. 60/198,573, filed on Apr. 20, 2000.

(51) Int. Cl.$^7$ .................................................. G02B 6/00
(52) U.S. Cl. ........................................................ 385/11
(58) Field of Search .............................. 385/11, 2, 3, 8, 385/9, 18, 25, 27, 31, 33, 34, 39

(56) References Cited

U.S. PATENT DOCUMENTS

| | | | | |
|---|---|---|---|---|
| 4,575,193 A | * | 3/1986 | Greivenkamp, Jr. ......... 359/495 |
| 5,204,771 A | * | 4/1993 | Koga ............................ 359/281 |
| 5,623,571 A | | 4/1997 | Chou et al. ................... 385/130 |
| 5,625,723 A | | 4/1997 | Dragone et al. .............. 385/11 |
| 5,629,991 A | | 5/1997 | Dragone ....................... 385/11 |
| 5,689,359 A | | 11/1997 | Kurata et al. ................. 359/281 |
| 5,901,259 A | | 5/1999 | Ando et al. ................... 385/16 |
| 6,011,885 A | | 1/2000 | Dempewolf et al. ......... 385/34 |
| 6,285,499 B1 | * | 9/2001 | Xie et al. ...................... 359/484 |
| 6,304,380 B1 | * | 10/2001 | Doerr ........................... 359/484 |
| 6,327,019 B1 | * | 12/2001 | Patel et al. ................... 349/196 |
| 6,330,097 B1 | * | 12/2001 | Chen et al. ................... 359/239 |
| 6,396,629 B1 | * | 5/2002 | Cao .............................. 359/484 |
| 6,404,536 B1 | * | 6/2002 | Lean et al. .................... 359/308 |
| 6,404,538 B1 | * | 6/2002 | Chen et al. ................... 359/323 |
| 6,404,549 B1 | * | 6/2002 | Huang et al. ................. 359/484 |
| 6,441,960 B1 | * | 8/2002 | Wang et al. .................. 359/497 |
| 6,480,331 B1 | * | 11/2002 | Cao .............................. 359/484 |

FOREIGN PATENT DOCUMENTS

| EP | 0 863 425 A | 9/1998 | ............. G02F/1/00 |
|---|---|---|---|
| EP | 0 945 750 A | 9/1999 | ........... G02B/27/28 |

* cited by examiner

*Primary Examiner*—Frank G. Font
*Assistant Examiner*—Kevin C Kianni
(74) *Attorney, Agent, or Firm*—Teitelbaum & MacLean; Neil Teitelbaum; Doug MacLean (57) ABSTRACT

This invention relates to elements such as birefringent crystals, which are used to separate a non-collimated input beam into two orthogonally polarized sub-beams or to combine two orthogonally polarized beams into a single beam. The optical device lessens or obviates the optical path length difference encountered in prior art devices and provides a polarization beam splitter/combiner that has substantially same optical path lengths for two split or combined beams propagating therethrough. Alternatively, the device is designed to provide a selected path length difference to compensate for polarization mode dispersion in other optical devices. The polarization beam splitter/combiner in accordance with the invention has a first uniaxial crystal having an o-ray path and an e-ray path and having the first port disposed at an end face thereof; a second uniaxial crystal having an o-ray path and an e-ray path, the e-ray path of the second uniaxial crystal being optically coupled with the o-ray path of the first uniaxial crystal and the o-ray path of the second uniaxial crystal being optically coupled with the e-ray path of the first uniaxial crystal. Alternatively, the axis of the second crystal is aligned in such a manner that the o-ray path is retarded by an extraordinary index of refraction of the crystal and the e-ray path is retarded by an ordinary index of refraction to equalize the optical path lengths.

19 Claims, 6 Drawing Sheets

POLARIZATION BEAM SPLITTER OR COMBINER

This application claims benefit of Provisional Application Ser. No. 60/198,573 FILED Apr. 20, 2000, and claims benefit of Ser. No. 60/218,136 filed Jul. 14, 2000.

FIELD OF THE INVENTION

This invention relates generally to elements such as uniaxial crystals, which are used to separate a non-collimated input beam into two orthogonally polarized sub-beams or to combine two orthogonally polarized beams into a single beam.

BACKGROUND OF THE INVENTION

Polarization independent devices such as optical circulators and isolators generally require separating the input beam having an unknown polarization state, into two orthogonally polarized sub-beams. These sub-beams are routed through the isolating elements of the device such as reciprocal and non-reciprocal rotators and are combined at an output end. However, if the beams are launched in a backwards direction non-reciprocal elements ensure that the light does not couple back into the input port. Rutile crystals are well known for the purpose of separating an input beam into two orthogonally polarized sub-beams thereby serving as a polarization beam splitter, or operated in an opposite direction as a polarization beam combiner. Within this specification the term polarization beam splitter is used however it should be understood, that the same device can serve as a polarization beam combiner operated in reverse.

It has been typical, for light propagating within these crystals to be collimated, most often by a graded index (GRIN) lens. In this instance a relatively large crystal is required to ensure separation of two beams that have diameters typically as large as 350 $\mu$m. However, recently, it was discovered that very small crystals, about $1/50^{th}$ the size of conventional crystals could be used with a non-collimated beam; using such small crystals substantially lessens the cost of manufacturing an optical device.

Many polarizers and polarizing beam splitters that separate an input from a beam into two orthogonal polarizations or that combine two orthogonal polarizations into one output beam are known to the art. These include a Glan-Thompson polarizer, which is a block of birefringent material cut into prisms and then cemented together, that acts by reflecting one polarization component at the cement interface and by transmitting the other. Another polarizer is a Glan-Taylor polarizer that is similar to the Glan-Thompson polarizer but uses an air space instead of cement to separate polarization components. The Wollaston, Rochon and Senarmont beam-splitters separate polarization components by transmitting the components through an interface.

However, one disadvantage of all of these prior art polarization beam splitters/combiners is that there is a difference in optical path length for the two separated orthogonal polarizations traveling through a birefringent crystal. Using birefringent crystals where the light propagating therethrough is not collimated, leads to an increase in insertion loss due to a defocusing or a need to compensate for the path length difference. The sub-beams follow a slow axis and a fast axis, which corresponds to this difference in optical path length shown in FIG. 1. In this figure an optical fibre 10 is shown having its end optically coupled with a rutile crystal 22 via a lens 12. It is typical after separating the beam into its two orthogonal polarization states to couple the light into two fibre ends (not shown). However, as can be seen from FIG. 1, the two focus spots do not lie on a same focal plane. This is due to the optical path length difference for the e-ray and the o-ray through the crystal 22. Generally pairs of optical fibres are held securely in a fixed manner in an optical fibre tube. In this instance if such a tube was used and disposed at one of the spots 14a or 14b, the other of the spots would not be in focus at the tube end, and light from either the e-ray or o-ray path would couple poorly.

It is an object of this invention to provide a device, which lessens or obviates this optical path length difference, or which provides compensation for PMD in an optical device.

It is an object of this invention to provide a polarization beam splitter/combiner that has substantially same optical path lengths for two split or combined non-collimated beams propagating therethrough.

Alternatively, it is an object of this invention to provide a polarization beam splitter/combiner that provides a selected optical path length difference for TE and TM polarization modes propagating therethrough.

An application for a beam splitter/combiner having equalized path length is found in integrated optical chromatic spatial dispersive elements, where polarization effects cause unwanted losses. There are three effects in a chromatic spatial dispersive element that are influenced by the light polarization state. These are polarization dependent wavelength (PD $\lambda$), polarization mode dispersion (PMD), and polarization dependent loss (PDL).

Ando et al. in U.S. Pat. No. 5,901,259 assigned to Nippon Telegraph and Telephone Corporation, propose inserting a polyimide optical waveplate in the middle of the optical path of an optical waveguide device, in order to reduce the polarization dependence of a planar lightwave circuit. However, this is difficult to manufacture and introduces undesired losses in the device.

The polarization beam splitter/combiner in accordance with the present invention can be used at the input or output of an optical chromatic spatial dispersive element to overcome these polarization effects without difficult manufacturing techniques or the introduction of unacceptable losses.

Thus, it is a further object of the present invention to provide a polarization beam splitter/combiner which compensates for polarization effects within an optical chromatic spatial dispersive element.

SUMMARY OF THE INVENTION

In accordance with the invention there is provided, a polarization beam splitter/combiner for splitting a non-collimated beam of light into first and second beams of orthogonal polarization, and for combining first and second beams of light of orthogonal polarization into a beam of light comprising:

a first port for launching a beam of light into the polarization beam splitter/combiner in a forward direction or for receiving a beam of light from the polarization beam splitter/combiner in a reverse direction;

a first uniaxial crystal having an o-ray path and an e-ray path and having the first port optically coupled to an end face thereof;

a second uniaxial crystal having an e-ray path and an o-ray path such that the e-ray path of the second uniaxial crystal is optically coupled with the o-ray path of the first uniaxial crystal and the o-ray path of the second uniaxial crystal is optically coupled with the e-ray path of the first uniaxial crystal; and a second and a third port optically coupled to an end face of the second uniaxial crystal for one of outputting a first beam of a first polarization state and a second beam of a second orthogonal polarization state in the forward direction and for launching the first beam of the first polarization state and the second beam of the second orthogonal polarization state into the polarization beam splitter/combiner in the reverse direction, wherein the polarization beam splitter/combiner provides selected relative optical path lengths for a first beam of the first polarization state and a second beam of the second orthogonal polarization state propagating therethrough.

In accordance with the invention it is alternatively provided, wherein an axis of the second crystal is aligned in such a manner that the o-ray path is retarded by an extraordinary index of refraction of the crystal and the e-ray path is retarded by an ordinary index of refraction to determine the relative optical path lengths.

A further embodiment, in accordance with the present invention, including a polarization rotator between the first uniaxial crystal and the second uniaxial crystal for rotating the polarization of light received from the first uniaxial crystal in a forward direction or for rotating the polarization of light received from the second uniaxial crystal in a reverse direction.

In a still further embodiment of the present invention, the polarization beam splitter/combiner including a polarizer for compensating for polarization dependent loss in an optical device.

Alternatively, in accordance with a preferred embodiment, a polarization beam splitter/combiner for providing polarization compensation in an optical chromatic spatial dispersion element comprises:

a first birefringent beam splitting element having at least one single port on an endface thereof;

a second birefringent element optically coupled to the first birefringent element, having at least one pair of ports spaced apart on an endface thereof associated with the at least one single port, and a first optical path from the at least one single port to one port of the associated pair of ports and a second optical path from the at least one single port to another port of the associated pair of ports; and means for changing the effective polarization state of a non-collimated beam of light propagating from the first birefringent element to the second birefringent element, such that the first optical path and the second optical path have relative path lengths selected to compensate for a known polarization mode dispersion in the optical chromatic spatial dispersion element.

BRIEF DESCRIPTION OF THE DRAWINGS

Exemplary embodiments of the invention will now be described in conjunction with the drawings in which:

FIG. 5b illustrates the states of polarization and position for light launched into the device shown in FIG. 5a;

DETAILED DESCRIPTION OF THE PREFERRED EMBODIMENTS

Figure 1:
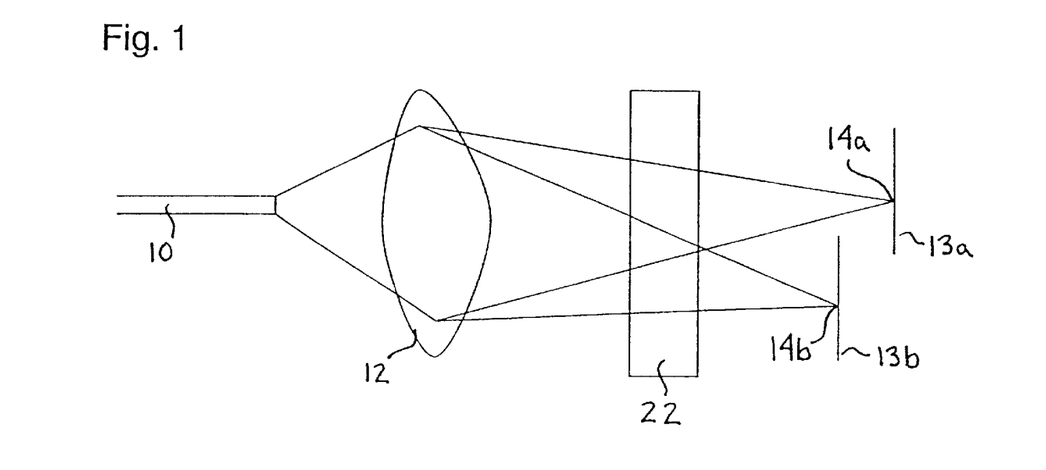
FIG. 1 is a schematic drawing illustrating a problem when two non-collimated beams are launched into a birefringent crystal and follow a slow axis and a fast axis, which corresponds to this difference in optical path length of the two sub-beams.

Turning now to FIG. 1, an non-collimated beam of light is shown launched from an optical fibre 10 via a lens 12 through a small birefringent crystal 22 and two focus spots 14a and 14b are shown at different focal planes 13a and 13b. A focusing lens is required between the birefringent crystal 22 and two optical fibres for coupling the orthogonal spatially separated sub-beams into the fibres. Since the optical path length followed by one of the sub-beams corresponding to the o-ray is longer than the optical path followed by the other of the sub-beams corresponding to the e-ray, the focal planes for the two beams are different. This difference in focal planes leads to poor coupling if the two fibres are spaced a same distance from the lens.

Figure 2:
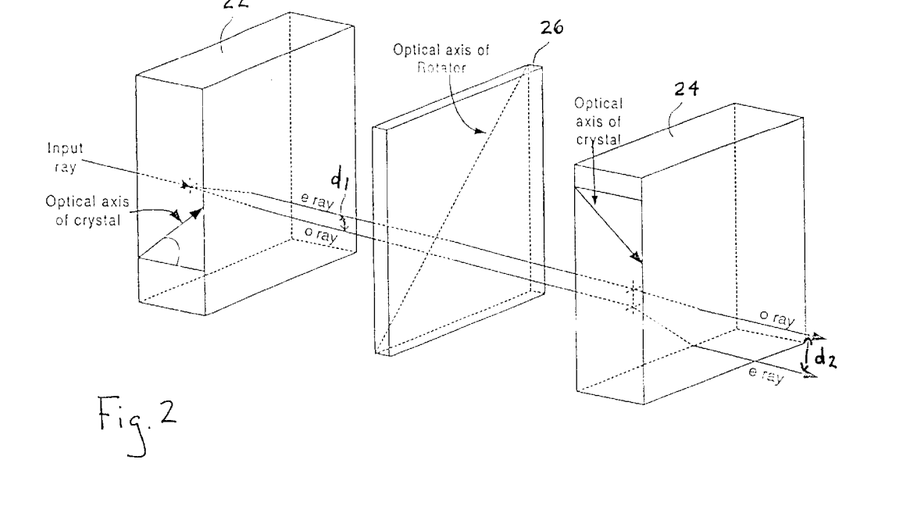
FIG. 2 is an isometric drawing illustrating an embodiment of the invention wherein components are shown separated for ease of viewing.

Referring now to FIG. 2, in accordance with an embodiment of the invention, a first uniaxial beam splitter/combiner in the form of a birefringent rutile crystal 22 is shown optically coupled with a second rutile crystal 24 of equal length. Materials for use as a uniaxial polarization beam splitter/combiner include, for example, rutile ($TiO_2$), yttrium vanadate ($YVO_4$), magnesium fluoride ($MgF_2$), quartz ($SiO_2$), lithium niobate ($LiNbO_3$), and calcite ($CaCO_3$). A polarization rotator 26, preferably a half-wave plate, is disposed between the rutile crystals 22 and 24. Although the components 22, 24, and 26 are shown separated, having a gap therebetween, in practice they are contacting one another having a thin layer of light transmissive adhesive therebetween, and/or, an antireflective coating therebetween. Physically coupling elements of this type is well known in the art of optical circulators and isolators. FIG. 2 illustrates that the optical axes of the crystals 22 and 24 are disposed such that the o-ray path and e-ray path of the first rutile crystal 22 are coupled to the e-ray path and o-ray path of the second rutile crystal 24, respectively. The operation of the device shown in FIG. 2 will be best understood in conjunction with the illustration of position and polarization states for the light passing through the embodiment of FIG. 2, shown in FIGS. 3*a* through 3*d*.

Figure 3:
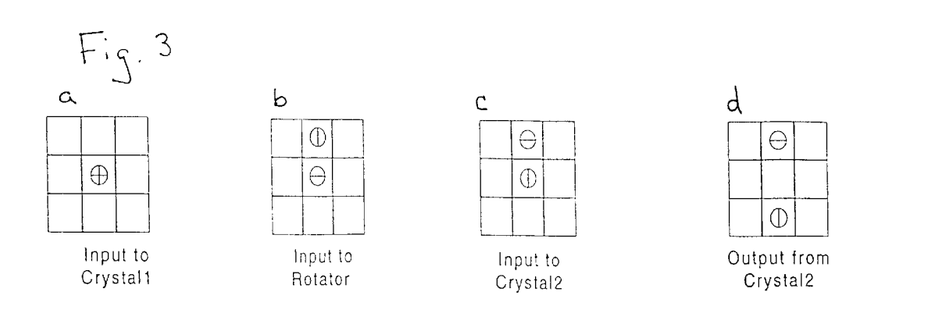
FIGS. 3a through 3d schematically illustrate a beam of light showing its polarization and position as it is launched into a first birefringent crystal and is passed as sub-beams through a polarization rotator and subsequently through a second birefringent crystal as shown in FIGS. 2a,b.

In operation an non-collimated beam of light is launched into an input port along an optical axis of the crystal 22 at an end face thereof; the beam is shown in this state in FIG. 3*a*. The beam is then split into sub-beams indicated by principal rays in the figure; the e-ray follows the e-ray path of the crystal and the o-ray follows the o-ray path of the crystal as is shown in FIG. 3*b*. When the sub-beams, exit the crystal 22, they are separated by a distance "d1" For clarity and simplicity, this is shown by the principal rays. These beams are then rotated by the half-wave plate 26 by 90° and appear in polarization states as shown in FIG. 3*c*. Thus the e-ray is presented to the second rutile crystal 24 as an o-ray after it has been rotated. The o-ray exiting the first rutile crystal 22 is presented to the second crystal as an e-ray. By so doing, the two rays, or sub-beams are further separated to a distance "d2" as illustrated by FIG. 3*d*. Advantageously, it can be seen that the optical path lengths of the two sub-beams diverging from the input beam can be controlled according to polarization state. By using crystals 22, 24 of equal length, the optical path lengths of the two polarization states are substantially equal. By varying the crystal length, axis orientation according to the crystal cut, and crystal material a selected relative path length difference can be introduced between the two polarization states to provide compensation for polarization mode dispersion effects.

Preferably, the optical axis of the half wave plate 26 is oriented at approximately 45 degrees to birefringent axes of the first and second uniaxial crystals 22,24. The optical axis of the half waveplate 26 is also preferably oriented at approximately 45 degrees to the polarization of light incident thereon from the first uniaxial crystal 22.

Advantageously this invention provides a way of coupling light that is made polarization diverse efficiently from a small crystal, without suffering from the drawbacks of unequal path lengths using uncollimated light. For many applications, the device in accordance with this invention is used with polarization maintaining fibre coupled to the ports disposed at an end face of the second rutile crystal 24 or to all of its ports, i.e. including the port disposed at an end face of the first crystal 22.

Figure 4:
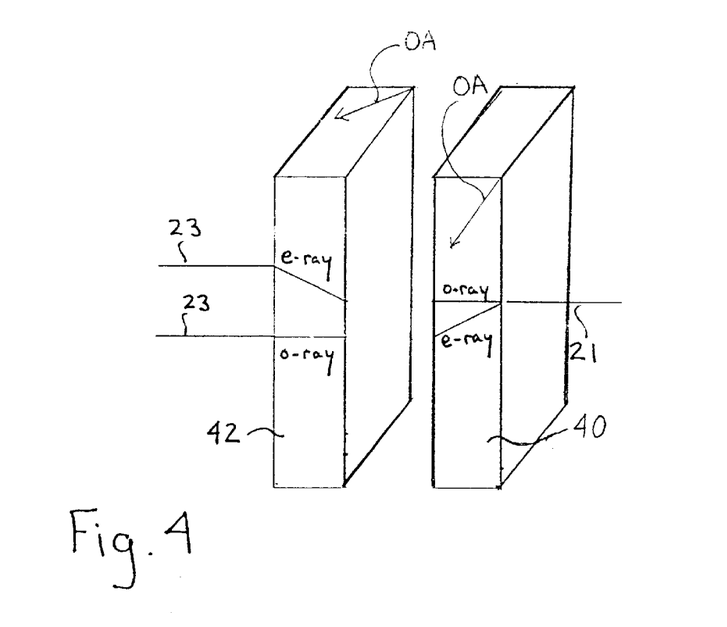
FIG. 4 shows a further embodiment of the present invention wherein the birefringent crystals are directly coupled.

FIG. 4 shows yet a further embodiment of the polarization beam splitter/combiner in accordance with the present invention wherein a first uniaxial beam splitter/combiner in the form of a birefringent crystal 40 and a second uniaxial beam splitter/combiner in the form of a birefringent crystal 42 of equal length are directly coupled. In this embodiment the optical axis of the second birefringent crystal 42 is rotated by 90 degrees with respect to the optical axis of the first birefringent crystal 40 as can be seen from FIG. 4 wherein the optical axis of crystal 40 is disposed in the plane of the page, and the optical axis of crystal 42 is coming out of the plane of the page. By appropriately orienting the birefringent crystals 40 and 42 the o-ray path of the second birefringent crystal 42 is optically coupled with the e-ray path of the first birefringent crystal 40 and the e-ray path of the second birefringent crystal 42 is optically coupled with the o-ray path of the first birefringent crystal 40, and thus the separation between the two output fibers is matched. Relatively rotating the axes of the two crystals 40,42 thus constitutes a means for changing the effective polarization state of light propagating from the first birefringent element to the second birefringent element. Advantageously, as can be seen from FIG. 4, the use of a rotator is not needed in this embodiment to yield a polarization beam splitter/combiner having equal or selected path lengths.

Figure 5A:
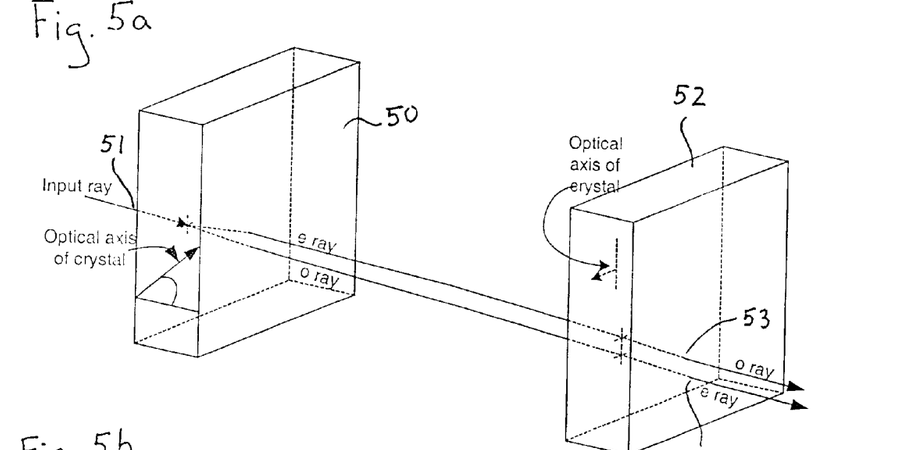
FIG. 5a shows a schematic view an alternative embodiment of the invention wherein the polarization beam splitter/combiner includes two crystals having axes oriented to provide polarization separation in the first crystal and different optical path lengths by index of refraction in the second crystal.

In many applications, the devices presented in FIGS. 2, 4 and 5*a* have polarization maintaining fiber 23 optically coupled to the two ports at one side of the device. On the other side of the device, a fiber 21 is optically coupled to the device. Depending on the application in which the device in accordance with the invention is used, fiber 21 is a regular fiber or a polarization maintaining fiber. Polarization maintaining fiber may be used at fiber 21, for example, to employ a phase difference of the combined orthogonally polarized beams to achieve a mixed polarization output. Any of the ports alternatively, can be directly coupled to an integrated waveguide device.

FIG. 5*a* shows an alternative embodiment of the invention wherein a uniaxial crystal in the form of a birefringent crystal 50 is optically coupled with a second uniaxial crystal 52. Crystal 100 splits the ordinary and extraordinary rays. The second crystal 52 has an optical axis cut at zero degrees (in the plane of the face of the crystal) and aligned in such a manner that the ordinary ray sees the extraordinary index of refraction of the crystal 52 and the extraordinary ray sees the ordinary index of refraction of the crystal 52. The drawing is labeled to reflect the type of ray seen by the crystals. At the end of the second crystal 52, the optical path length followed by the two rays is equivalent. The second crystal 52 acts a retarder to equalize the optical path length. The thickness of the first crystal 50 is determined by the direction of the optical axis of the first crystal 50, and the materials of the first and second crystals 50,52. The materials may be different in the different crystals 50,52, for instance $YVO_4$ and rutile.

Figure 5B:
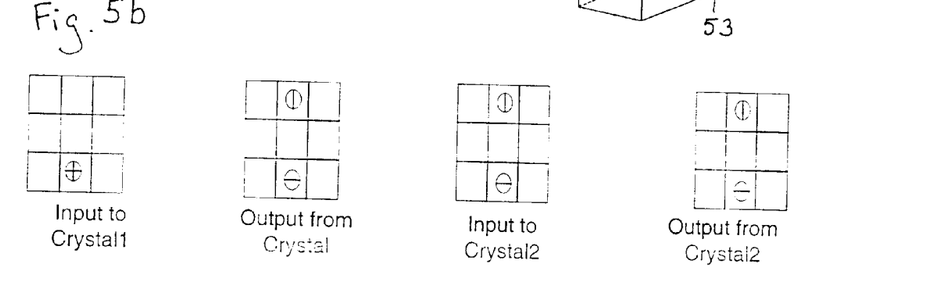

FIG. 5*b* shows the polarization state and position of the principal rays passing through the polarization beam splitter/combiner. The input to the first crystal 50 at port 51 shows mixed polarization. The orthogonal polarizations are split by the first crystal 50 and input without rotation into the second crystal 52. In this embodiment, the separation is determined by the selection of material and dimension of the first crystal 50. The second crystal 52 provides equalization of the optical paths. The output of crystal 52 still has the same polarization, but the o-ray was passed through the second crystal 52 at an angle to the axis of the crystal to see the extraordinary index of refraction, and the e-ray to see the ordinary index of refraction of the crystal. Thus, the cut of the second crystal constitutes a means for changing the effective polarization state of light propagating from the first birefringent element to the second birefringent element. As a result, the o-ray has been retarded more that the e-ray to equate the optical path lengths.

Figure 6:
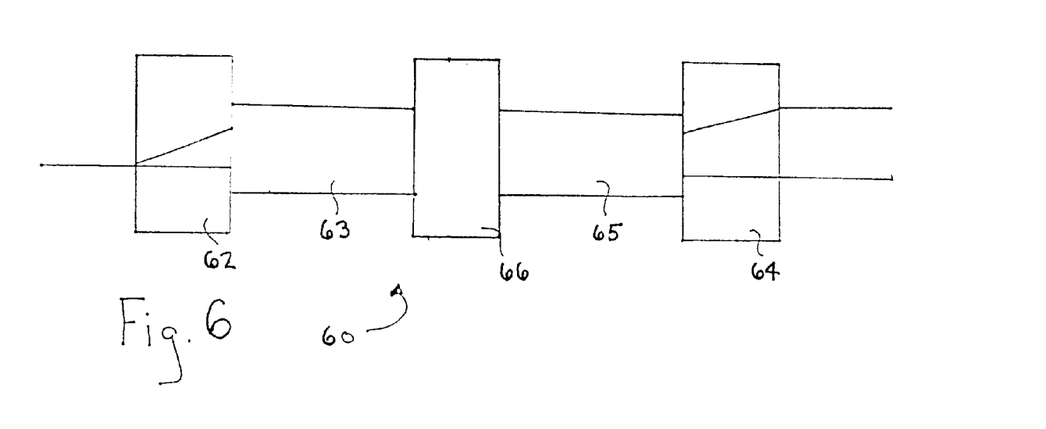
FIG. 6 shows a schematic view of another alternative polarization beam splitter/combiner including collimating and focusing lenses within the splitter/combiner structure.

FIG. 6 A further embodiment of the present invention 60 includes lenses 63, 65 to receive the sub-beams from the first crystal 62 and to collimated the sub-beams directed to the rotator 66 and to refocus the sub-beams prior to passing the light through the second crystal 64. Conveniently, graded index (GRIN) lenses less than a quarter pitch can be used, since the light from the crystal is diverging and no longer a point source. Of course, other aspheric lenses can be used. Advantageously, by collimating the beam after passing through the crystal, the size of the crystal does not have to be increased to accommodate the larger collimated beam. A further advantage is that coupling is improved since the magnification is 1:1. Greater coupling losses occur if a longer lens is used to focus the output of the complete splitter assembly, because the thickness of the assembly causes greater beam divergence that leads to defocusing aberrations.

As mentioned above, a polarization beam splitter/combiner in accordance with the present invention can be coupled to an integrated optical chromatic spatial dispersive element, to reduce polarization effects of polarization dependent wavelength (PD λ), polarization mode dispersion (PMD) and polarization dependent loss (PDL).

Figure 7A:
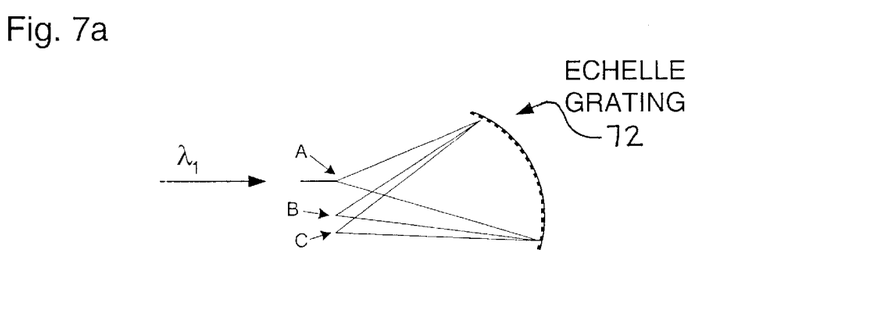
FIG. 7a illustrates the polarization dependent λ effect in an echelle grating.
Figure 7B:
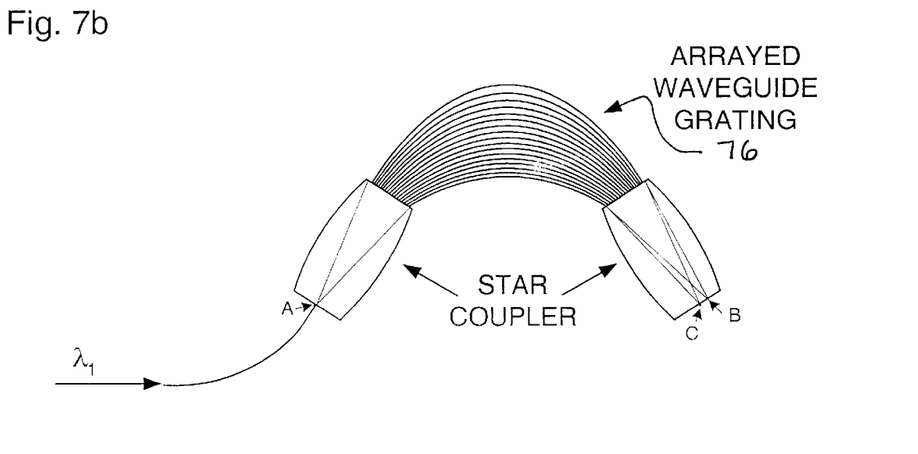
FIG. 7b illustrates the polarization dependent λ effect in an arrayed waveguide grating.
Figure 7C:
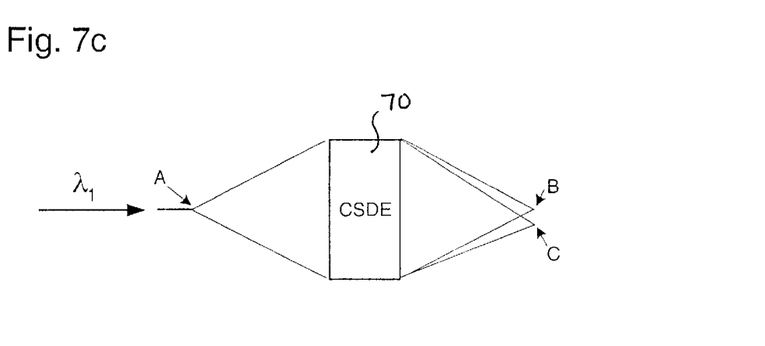
FIG. 7c is a schematic illustration of the polarization dependent λ effect generally for a chromatic spatial dispersion element.

FIG. 7 illustrates two types of integrated optical chromatic spatial dispersive elements. The first example 7a is used in planar waveguide technology, where the dispersion is created by an echelle grating 72. The second example 7b, is an arrayed waveguide grating (AWG) 76. In both examples 7a and b, light at a given wavelength $\lambda_1$ passing through the device will not see the same phase delay for different polarization states in the dispersive element. That will cause the light to follow two different paths and to end up at two different positions (B and C) for the two different polarization states (TE and TM). This is called PD λ. The same effect will also cause a temporal delay between the two beams, which will cause some PMD. Since the TE and TM do not have the same propagation losses both outputs will have different intensities. This is called PDL.

Figure 8:
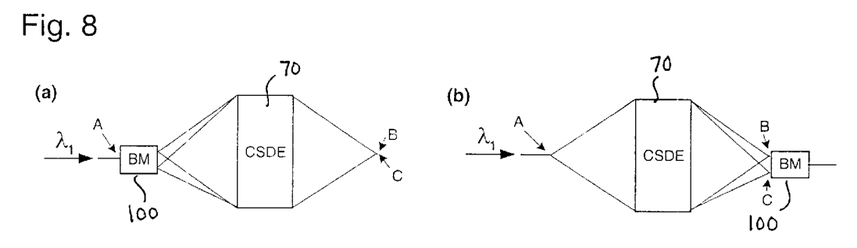
FIG. 8a illustrates a birefringent module comprising a polarization beam combiner employed at an input of an optical chromatic spatial dispersion element.
FIG. 8b illustrates a birefringent module comprising a polarization beam combiner employed at an output of an optical chromatic spatial dispersion element.

For any integrated optical chromatic spatial dispersive element (CSDE) 70 this polarization dependence can be mitigated by the polarization beam splitter/combiner of the present invention. The polarization beam splitter/combiner, termed a birefringence module 100, is coupled to a dispersive element 70. As shown in FIG. 8 a birefringence module can be coupled to the input or output of the dispersive element.

Figure 9:
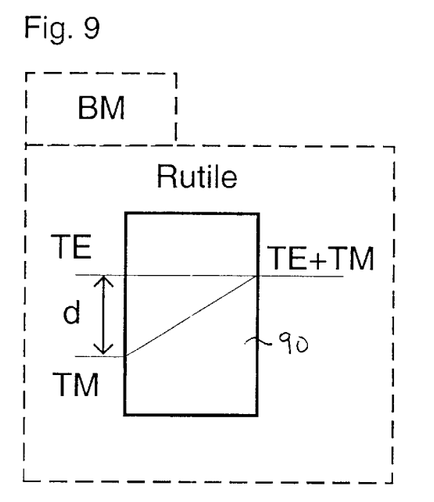
FIG. 9 is a schematic view of a simplified birefringent module comprising a single rutile crystal as a polarization splitter/combiner.

The lateral offset d between B and C caused by PD λ can be compensated by a single birefringent element 90 as seen in FIG. 9, which is a simple polarization beam splitter/combiner. However, the polarization mode dispersion is uncorrected.

Figure 10:
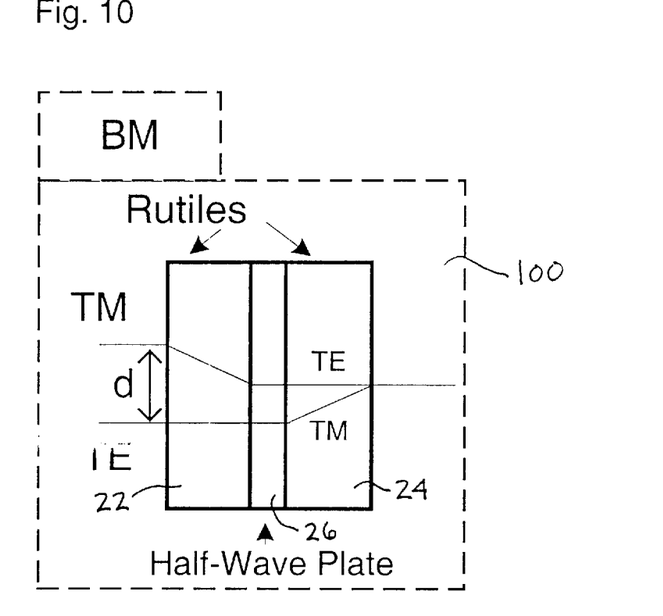
FIG. 10 is a schematic view of a birefringent module corresponding to the embodiment shown in FIG. 2.

FIG. 10 shows a birefringence module 100, analogous to the embodiment described with reference to FIG. 2, in which the optical path lengths of the TE and TM polarization states are substantially equal. The thickness and axis orientation of each crystal is chosen to give a total polarization offset of a desired distance d, and to create a time delay between the two polarizations of an opposite value to the CSDE delay. Thus, by altering the design from substantially equal optical path lengths, the birefringence module 100 can provide compensation for PMD in the CSDE 70.

Because light launched at any point on the input face of the uniaxial crystal will follow parallel e-ray and o-ray paths, the beam splitter/combiner can have a plurality of ports, meaning input or output locations where light is launched into, or received from a birefringent element. A beam splitter/combiner 100 for use with a dispersive element will have a plurality of pairs ports on one side of the device and a plurality of single ports on the opposite side of the device, each pair having an associated single port. The pairs of ports may be disposed to receive light from the dispersive element 70 or to launch light into the dispersive element 70 as shown in FIG. 8.

Figure 11:
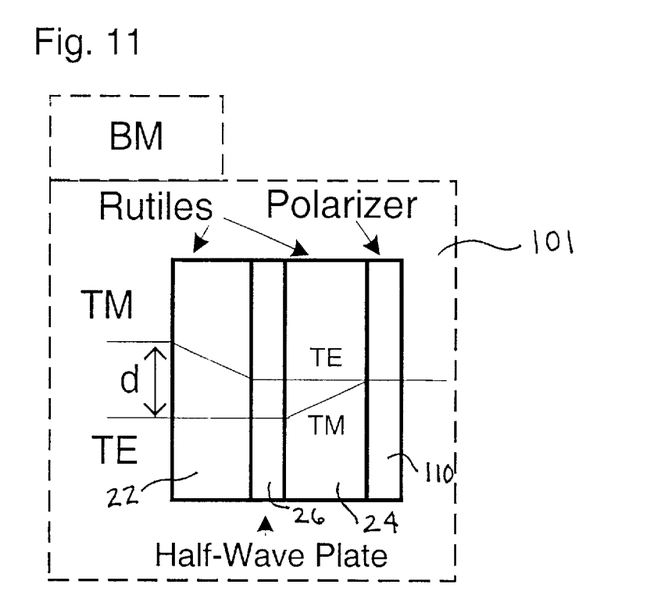
FIG. 11 is a schematic view of an alternative birefringent module in accordance with the present invention.

FIG. 11 shows an alternative embodiment of the birefringence module 101 including a polarizer 110 at the end face of the module 101 where the beams are combined. The polarizer is selected to have an extinction ratio between the two polarization states to compensate for PDL in the CSDE 70. Thus, if the intensity of light of the two polarization states is not equal after passing through the CSDE, a polarizer can be selected to absorb a portion of the less attenuated polarization state at the output of the birefringence module 101.

Figure 12:
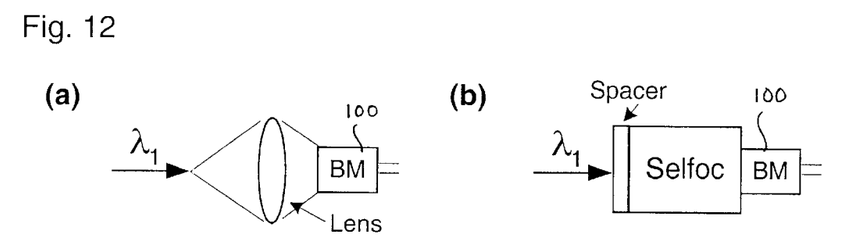
FIG. 12a is a schematic illustration of a lens providing a collimated beam to the birefringent module.
FIG. 12b is a schematic illustration of an alternative lens structure for providing a collimated beam to the birefringent module.

Loss within the birefringence module 100/101 can be minimized by incorporating lenses 120 to image and refocus the beam before or after the birefringence module 100/101 as shown in FIG. 12. Alternatively, as described with reference to FIG. 6, lenses 63 and 65 can be provided within the birefringence module 100/101.

Numerous other embodiments can be envisaged without departing from the spirit and scope of the invention, which is defined in the claims.

What is claimed is:

1. A polarization beam splitter/combiner for splitting a non-collimated beam of light into first and second sub-beams of orthogonal polarization comprising:
   a first port for launching the beam of light into the polarization beam splitter/combiner in a forward direction;
   a first uniaxial crystal optically coupled to the first port for separating the beam of light into the first and second sub-beams, which propagate along diverging o-ray and e-ray paths, respectively, the first crystal being made of a first material, having a first thickness and a first birefringent axis;
   a second uniaxial crystal having an e-ray path and an O-ray paths such that the e-ray path of the second uniaxial crystal is optically coupled with the O-ray path of the first uniaxial crystal and the O-ray path of the second uniaxial crystal is optically coupled with the e-ray path of the first uniaxial crystal, the second crystal being made of a second material, having a second thickness and a second birefringent axis, which is non-parallel to the first birefringent axis; and
   a second and a third port optically coupled to an end face of the second uniaxial crystal for outputting the first sub-beam and the second sub-beam, respectively, with a spatial separation therebetween in the forward direction,
   wherein an optical path length difference between the first sub-beam and the second sub-beam is negated or predetermined by the first and second materials, and the first and second thicknesses.

2. A polarization beam splitter/combiner as defined in claim 1, wherein the plane of the birefringent axis of the first uniaxial crystal and the plane of the birefringent axis of the second uniaxial crystal are oriented 90 degrees to each other.

3. A polarization beam splitter/combiner as defined in claim 1, wherein the first uniaxial crystal and the second uniaxial crystal are optically coupled to provide equal optical path lengths.

4. A polarization beam splitter/combiner as defined in claim 3, wherein the first material and the second material comprise a same material; and wherein the first thickness and the second thickness are equal to provide equal optical path lengths.

5. A polarization beam splitter/combiner as defined in claim 1, wherein the second birefringent axis is aligned in such a manner that the o-ray path is retarded by an extraordinary index of refraction of the second crystal and the e-ray path is retarded by an ordinary index of refraction to determine the relative optical path lengths.

6. The polarization beam splitter/combiner as defined in claim 1, further including a polarization rotator between the first uniaxial crystal and the second uniaxial crystal for rotating the polarization of light received from the first uniaxial crystal.

7. The polarization beam splitter/combiner as defined in claim 6 further including lenses for collimating and focusing the light between the first and second uniaxial crystals.

8. The polarization beam splitter/combiner as defined in claim 6 wherein the polarization rotator is a half wave plate.

9. The polarization beam splitter/combiner as defined in claim 8, wherein the half wave plate is for rotating the polarization of light incident thereon by 90 degrees.

10. The polarization beam splitter/combiner as defined in claim 8, wherein an optical axis of the half wave plate is oriented at approximately 45 degrees to birefringent axes of the first and second uniaxial crystal.

11. The polarization beam splitter/combiner as defined in claim 10, wherein the optical axis of the half waveplate is oriented at approximately 45° to the polarization of light incident thereon from the first uniaxial crystal.

12. The polarization beam splitter/combiner as defined in claim 1, wherein different relative optical path lengths are selected to compensate for polarization mode dispersion in an optical device.

13. The polarization beam splitter/combiner as defined in claim 1, further including a polarizer for compensating for polarization dependent loss in an optical device.

14. The polarization beam splitter/combiner as defined in claim 1, wherein the first and second materials are selected from the group consisting of: rutile ($TiO_2$), yttrium vanadate ($YVO_4$), magnesium fluoride ($MgF_2$), quartz ($SiO_2$), lithium niobate ($LiNbO_3$), and calcite ($CaCO_3$).

15. The polarization beam splitter/combiner as defined in claim 1, wherein the second and third ports are optically coupled to polarization maintaining waveguides.

16. The polarization beam splitter/combiner as defined in claim 15, wherein the first port is optically coupled to a polarization maintaining waveguide.

17. The polarization beam splitter/combiner in accordance with claim 1, wherein second and third ports are alternatively for inputting third and fourth orthogonally polarized sub-beams, respectively, for combining at the first port; whereby the third sub-beam propagates along the e-ray path of the second uniaxial crystal and the O-ray path of the first uniaxial crystal to first port, while the fourth sub-beam propagates along the O-ray path of the second uniaxial crystal and the e-ray path of the first uniaxial crystal to the first port.

18. A polarization beam splitter/combiner for combining first and second orthogonally polarized sub-beams of light into an output beam of light comprising:

first and second input ports for launching the first and second sub-beams, respective with a spatial separation therebetween;

a first uniaxial crystal optically coupled to the first and second input ports for narrowing the spatial separation between the first and second sub-beams, the first uniaxial crystal defined an O-ray path for propagating the first sub-beam and an e-ray path for propagating the second sub-beam, the first uniaxial crystal being made of a first material, having a first thickness and a first birefringent axis;

a second uniaxial crystal having an e-ray path optically coupled with the O-ray path of the first uniaxial crystal, and an O-ray path optically coupled with the e-ray path of the first uniaxial crystal, the e-ray and O-ray paths of the second uniaxial crystal intersecting at an end face thereof, the second uniaxial crystal being made of a second material, having a second thickness and a second birefringent axis, which is non-parallel to the first birefringent axis; and an output port on the end face of the second uniaxial crystal at the intersection of the o-ray path and the e-ray path for outputting the output beam of light;

whereby the first and second sub-beams are combined without an optical path length difference therebetween.

19. The polarization beam splitter/combiner according to claim 18, further comprising a polarization rotator disposed between the first and second uniaxial crystals for rotating the polarization of the first and second sub-beams.

* * * * *

UNITED STATES PATENT AND TRADEMARK OFFICE
CERTIFICATE OF CORRECTION

PATENT NO. : 6,711,311 B2
DATED : March 23, 2004
INVENTOR(S) : Delisle et al.

It is certified that error appears in the above-identified patent and that said Letters Patent is hereby corrected as shown below:

Column 10,
Line 14, "second sub-beams, respective with" should read -- second sub-beams, respectively, with --
Line 19, "defined an O-ray" should read -- defined by an o-ray --

Signed and Sealed this

Twelfth Day of October, 2004

JON W. DUDAS
*Director of the United States Patent and Trademark Office*